United States Patent
Gaither

(10) Patent No.: US 12,162,434 B2
(45) Date of Patent: Dec. 10, 2024

(54) SYSTEM AND METHOD FOR MOTORIZED LOWERING OF A TUBE-STEP OR RUNNING BOARD

(71) Applicant: TOYOTA MOTOR ENGINEERING & MANUFACTURING NORTH AMERICA, INC., Plano, TX (US)

(72) Inventor: Geoffrey D. Gaither, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 316 days.

(21) Appl. No.: 17/697,810

(22) Filed: Mar. 17, 2022

(65) Prior Publication Data

US 2023/0294608 A1    Sep. 21, 2023

(51) Int. Cl.
*B60R 3/02*    (2006.01)
*B60R 3/00*    (2006.01)

(52) U.S. Cl.
CPC ............... *B60R 3/02* (2013.01); *B60R 3/002* (2013.01)

(58) Field of Classification Search
CPC ............. B60R 3/00; B60R 3/02; B60R 3/002
See application file for complete search history.

(56) References Cited

U.S. PATENT DOCUMENTS

| | | | | |
|---|---|---|---|---|
| 6,325,397 B1 * | 12/2001 | Pascoe | ...................... | B60R 3/02 280/169 |
| 7,070,194 B2 * | 7/2006 | Garland | .................. | B60R 3/002 280/166 |
| 8,714,575 B2 * | 5/2014 | Watson | ..................... | B60R 3/02 280/166 |
| 9,101,519 B2 | 8/2015 | Smith | | |
| 9,174,580 B2 * | 11/2015 | Cha | ........................... | B60R 3/02 |
| 9,272,667 B2 * | 3/2016 | Smith | ....................... | B60R 3/02 |
| 9,481,408 B2 * | 11/2016 | Lee | ...................... | B62D 35/001 |
| 9,702,349 B2 * | 7/2017 | Anderson | ............ | B60G 17/052 |
| 9,758,104 B2 | 9/2017 | Fichter | | |
| 9,802,545 B1 * | 10/2017 | Salter | ...................... | B60R 3/002 |
| 10,011,232 B2 * | 7/2018 | Burton | ...................... | B60R 3/02 |
| 10,081,302 B1 * | 9/2018 | Frederick | ................ | B60R 3/002 |
| 10,336,260 B1 | 7/2019 | Salter | | |
| 11,299,099 B2 * | 4/2022 | Berger | ...................... | B60R 3/02 |
| 11,458,900 B2 * | 10/2022 | Watson | ................... | B60R 3/002 |
| 11,630,457 B2 * | 4/2023 | Berberian | ............ | G05D 1/027 701/28 |
| 11,781,369 B2 * | 10/2023 | Salter | ...................... | E05F 15/75 49/31 |

(Continued)

FOREIGN PATENT DOCUMENTS

| | | | |
|---|---|---|---|
| DE | 102018004572 A1 | 11/2018 | |
| EP | 3560788 A1 * | 10/2019 | ............... B60R 3/02 |

*Primary Examiner* — James M Dolak
(74) *Attorney, Agent, or Firm* — SHEPPARD, MULLIN, RICHTER & HAMPTON LLP; Daniel N. Yannuzzi

(57) ABSTRACT

Systems and methods are provided for a running board. In particular, a motorized running board system that improves accessibility for vehicle occupants entering or exiting a vehicle. Certain embodiments of the motorized running board system may include a running board connected via at least one motor to a vehicle and an electronic control unit that detects a contextual environment, determines a preferred running board position from the contextual environment, and adjusts the running board to reach the preferred running board position.

9 Claims, 6 Drawing Sheets

(56) References Cited

U.S. PATENT DOCUMENTS

| | | | |
|---|---|---|---|
| 11,881,063 B2 * | 1/2024 | Du | G07C 5/0808 |
| 11,884,337 B2 * | 1/2024 | Milani | B60R 3/02 |
| 11,987,207 B2 * | 5/2024 | Williams | B60R 25/104 |
| 12,043,213 B2 * | 7/2024 | Yang | B60R 3/02 |
| 2021/0155264 A1 | 5/2021 | MacPherson | |

* cited by examiner

SYSTEM AND METHOD FOR MOTORIZED LOWERING OF A TUBE-STEP OR RUNNING BOARD

TECHNICAL FIELD

The present disclosure relates generally to vehicle tube-steps and running boards, and in particular, some implementations may relate to a motorized running board system that enables a running board(s) to adjust to various positions, and act as a lift to assist vehicle occupants when entering or exiting the vehicle.

DESCRIPTION OF RELATED ART

Many vehicles include tube-steps and running boards along the respective sides of such vehicles. Traditionally, these tube-steps and running boards provide vehicle occupants with an additional step, when entering or exiting the vehicle, to reduce the distance between, e.g., the ground and an ingress point(s) of the vehicle, such as the interior floor of the vehicle. Conventional tube-steps and running boards are fixed and may only be adjusted by a mechanic or through extensive vehicle alteration. More advanced tube-steps and running boards may move between a raised/retracted position and a lowered/deployed position when a vehicle door is opened or closed. However, these tube-steps are problematic because the retracted and deployed positions only have one level or are at fixed heights, which may be challenging to use for certain vehicle occupants (e.g., senior citizens or those with limited mobility) or may be inappropriate for the environmental features surrounding the vehicle. For example, when a vehicle is parked over a large pothole, the depth of the large pothole in addition to the static height of the running board can make the running board too high for the vehicle occupant to comfortably egress the vehicle.

BRIEF SUMMARY OF THE DISCLOSURE

According to various embodiments of the disclosed technology, a motorized running board system is disclosed herein. In various embodiments, a vehicle system may comprise a running board connected via at least one motor to the vehicle and an electronic control unit. The electronic control unit may include machine executable instructions in non-transitory memory to detect the vehicle's contextual environment; determine a preferred position of the running board based on the contextual environment; and adjust position of the running board by actuating the at least one motor to reach the preferred position.

In certain embodiments, detecting the vehicle's contextual environment comprises receiving data from vehicle sensors representative of surrounding environmental features; and forming a localized map of the surrounding environmental features based on the received sensor data. The localized map may comprise a topographic representation of distances from the body of the vehicle to environmental features. In certain embodiments, determining a preferred position of the running board comprises detecting a current position of the running board; detecting a position of the vehicle; predicting a range of possible positions of the running board by retrieving a known range of motions of the running board, and limiting the known range of motion to form a range of possible positions by comparing the known range of motion to the localized map and removing areas that would cause the running board to collide with environmental features; and determining the preferred position of the running board based on the current orthogonal position of the running board, the orthogonal position of the vehicle, the range of possible positions of the running board, and driver preference.

In certain embodiments, adjusting the position of the running board comprises actuating at least one motor to adjust the position of the running board to reach the preferred position of the running board. Adjusting the running board improves vehicle occupant accessibility when entering and exiting the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
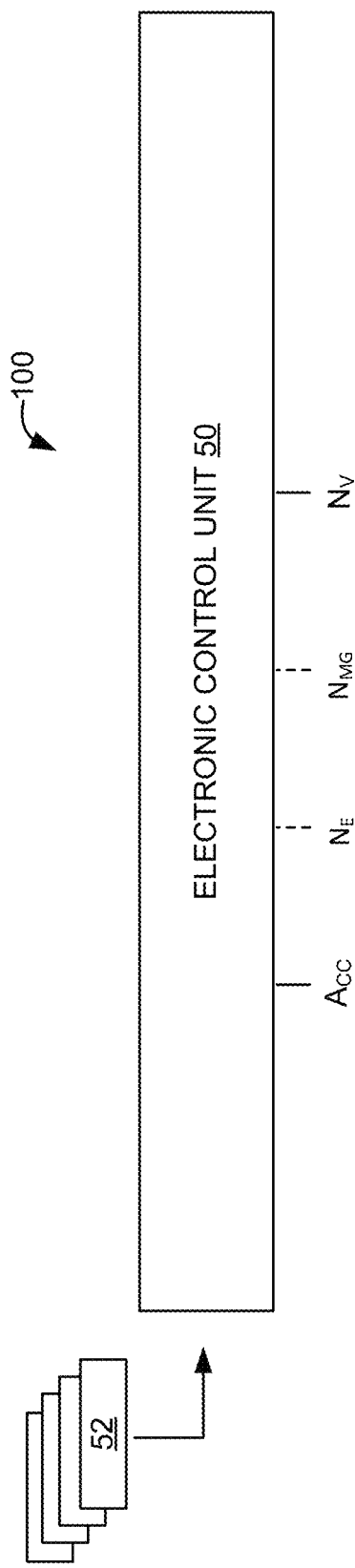
FIG. 1 is a schematic representation of an example vehicle having an electronic control unit and sensors in which various embodiments of the motorized running board system may be implemented.

The figures are not exhaustive and do not limit the present disclosure to the precise form disclosed.

DETAILED DESCRIPTION

Running boards or tube-steps may refer to vehicle systems that are connected to the underbody of a vehicle or run parallel to the side of the vehicle, which can help vehicle occupants, such as drivers and passengers, enter and exit the vehicle by reducing the distance a vehicle occupant has to step between the ground and the interior of the vehicle cabin.

A problem with conventional running boards is that they are often fixed or move between fixed positions. These fixed positions may decrease the comfort, safety, and accessibility for vehicle occupants when entering and exiting the vehicle in various contextual environments (e.g., uneven ground, nearby curbs, protrusions, depressions, holes, uneven vehicle parking, and similar features which create uneven features near or within a vehicle). For example, when a vehicle is parked on uneven ground or over a hole, the distance an occupant may have to step to reach the running board from the ground may be too far for vehicle occupants to reach comfortably or safely, or may be inaccessible for those with limited movement abilities. Alternatively, when a vehicle is parked over a protrusion, e.g., on a road surface, the distance an occupant may have to step to reach the running board from the ground may be too short to provide assistance when entering or exiting the vehicle.

Embodiments of the presently disclosed technology respond to comfort, safety, and accessibility challenges when entering or exiting a vehicle via a running board by adjusting the running board to account for the contextual environment surrounding the vehicle. By doing this, embodiments can reduce or increase the distance a vehicle occupant may have to step to reach the running board from the ground, reach the vehicle cabin from the running board, and/or reach the ground from the running board. In certain embodiments, the disclosed vehicle system may adjust the running board's position while a vehicle occupant is standing on the running board to further improve accessibility for vehicle occupants.

In various embodiments, a vehicle system may comprise a running board connected via at least one motor to the vehicle and an electronic control unit (ECU). Here, the ECU in the vehicle may (1) detect the vehicle's contextual environment; (2) determine a preferred position of the running board based on the contextual environment; and (3) adjust position of the running board by actuating the at least one motor to reach the preferred position.

In various embodiments, the contextual environment may be composed of information relating to the current position of the running board, information relating to the surrounding environmental features, and information relating to the position of the vehicle. Here, the ECU may first need to detect the vehicle's contextual environment because if the vehicle's contextual environment is uniform (e.g., the vehicle is parked on a flat road, without depressions or protrusions, and not near a curb), the running board can operate similarly to conventional systems. For example, if a vehicle is parked in a parking lot, the position of the running board may open from a retracted position to a position half-way between the vehicle body and the ground. Such a position may be determined or pre-programmed by a vehicle manufacturer, and may serve a default position for the running board to adjust do when a door opens or is otherwise activated, when the contextual environment does not require adjusting the default position to a new preferred position.

Alternatively, when the contextual environment is not uniform, the ECU may detect features of the vehicle's contextual environment in various ways. In certain embodiments, the ECU may receive data from vehicle sensors representative of surrounding environmental features. In such embodiments, received sensor data may be used to form a localized map of the surrounding environmental features. The localized map may be a topographic representation of distances from the body of the vehicle to environmental features. For example, if the vehicle is parked over a rock, vehicle sensors may produce data representative of a protrusion, and the localized map may reflect a protrusion, a specific distance away from the vehicle and in the shape and size of the particular rock. In other embodiments, the ECU may monitor other vehicle sensors or systems such as radar or LiDAR systems that already form maps of the surrounding area, and extrapolate distances from the vehicle body to environmental features represented in the already formed maps to detect the overall contextual environment.

Second, the ECU may determine a preferred position of the running board based on the contextual environment. In certain embodiments, the ECU may detect an orthogonal position of the running board via vehicle sensors or systems. In embodiments, the position the ECU initially detects the running board in may be the running board's current position. For example, the ECU may monitor LiDAR sensors to determine the height of the running board, the vertical and horizontal distance of the running board from the vehicle, the radial position of the running board, and possibly whether the running board is angled on any other axis. In other embodiments, the ECU may retrieve stored information from a memory of the previously adjusted to position of the running board. In other embodiments, the ECU may monitor vehicle sensors representative of the positions of the at least one motor connecting the running board to the body of the vehicle.

Next, the ECU may detect an orthogonal position of the vehicle. The orthogonal position of the vehicle can be determined in various ways. In certain embodiments, the orthogonal position of the vehicle can be detected by vehicle sensors or systems, such as a gyroscope or similar positional or non-inertial location systems. In other embodiments, the orthogonal position of the vehicle may be detected from the contextual environment. For example, if a feature of known size (e.g., stop sign) is detected near the vehicle, the ECU may comparatively measure the feature of known size to surrounding environmental features.

The ECU then may predict a range of possible positions of the running board. In various embodiments, the ECU may store a known range of motions of the running board. For example, the running board may be able to move a certain distance vertically, a certain distance horizontally, and a certain angular distance radially. In this example, the range of motions would be the maximum and minimum distances the running board can move vertically, horizontally, and radially, limited by the construction of the motor (e.g., how far it can extend, and in what directions). The ECU may overlay this known range of motions of the running board onto the localized map to predict a range of possible positions of the running board. The range of possible positions of the running board is predicted by taking the known range of motion and limiting the range of the vertical, horizontal, and/or radial motions the running board could move in to prevent the running board from coming into contact with an environmental feature, as depicted on the localized map. In other embodiments, the ECU may account for a buffer area between the running board and environmental features, which may range from 1 cm to 100 cm, allowing for increased utility in the running board. For example, if the vehicle is parked over a rock, the vertical range of motion may be limited to prevent the running board from striking the rock, thus the possible positions of the running board would be the known range of motions, minus the vertical height of the rock. Further, the buffer area may be 35 cm, which would allow for a vehicle occupant to benefit from the running board, rather than step onto a running board immediately above a rock. In other words, the predicted range of possible positions includes the entire known range of motion, minus the area determined to cause a collision between the running board and the rock, minus the buffer area.

Then, the ECU may determine a preferred position of the running board from the contextual environment in real time. In various embodiments, the ECU may retrieve a default preferred position, which may be set by a manufacturer or vehicle occupant. The default preferred position, may be static or adjust by vehicle occupant input or machine learning models to better standardize running board placement. In various embodiments, the ECU may determine the preferred position of the running board based on physical or calculated relationships within the contextual environment, and adjust the expected default position to a preferred position to account for the contextual environment. In certain embodiments, the default position may be half-way between the body of the vehicle and the ground. In other embodiments, the preferred position may be half-way between the body of the vehicle and the furthest possible position of the running board away from the body of the vehicle, accounting for contextual environment. For example, if the vehicle is parked next to a curb, the preferred position may be half-way between the body of the vehicle and the surface on top of the curb. In other embodiments, the preferred position may be closer to the vehicle. In other embodiments, the preferred position may be closer to the ground or environmental feature. The preferred position may be preset or have a standard position (e.g., half-way between vehicle body and environmental feature). The preferred position may also be determined by driver preference (e.g., a driver may wish to always have the running board one third the distance from the vehicle body to the environmental feature, or always six-inches from the environmental feature regardless of vehicle position). In various embodiments, the preferred position may only be adjusted to when an environmental feature is detected.

Once a preferred position is determined, the ECU may adjust the position of the running board to reach the preferred position. Where the running board is connected to the vehicle via at least one motor, the ECU may send signals to actuate the motor in accordance with values representative of reaching the preferred position. In other embodiments, the running board may be adjusted using other techniques, such as through pneumatic adjustment. By doing this, the accessibility of the vehicle may be increased by positioning the running board at preferred positions tailored to unique environmental features.

In other embodiments, the running board may be adjusted when a vehicle occupant is standing on it. In such an embodiment, the running board may act as a lift to assist a vehicle occupant enter or exit the vehicle. To use the running board as a lift, a first preferred position may be manually set to be closer to the ground or environmental feature. Once the vehicle occupant has stepped onto the running board, they may either manually activate or activate by sensor (e.g., a weight sensor detecting that weight has been applied to the running board) the lift assist function. Once activated, the ECU may determine a second preferred position, which may, for example, be closer to the vehicle body than the first preferred position. The vehicle may then stand upon the running board as the ECU actuates the at least one motor to adjust the position of the running board from the first preferred position to the second preferred position. Once the running board has reached the second preferred position, the vehicle occupant may step from the running board to the interior of the cabin. In another example, the first preferred position may be closer to the vehicle and the second preferred position may be closer to the ground, and the adjusted running board may be used as a lift assist to exit the vehicle.

It should be understood that the systems and methods disclosed herein may be implemented with any of a number of different vehicles and vehicle types. For example, the systems and methods disclosed herein may be used with automobiles, trucks, motorcycles, recreational vehicles and other like on or off-road vehicles. In addition, the principals disclosed herein may also extend to hybrid vehicles, gasoline- or diesel-powered vehicles, fuel-cell vehicles, electric vehicles, or other vehicles.

FIG. 1 is a schematic representation of an example vehicle (vehicle 100) having an electronic control unit 50 and sensors 52 in which various embodiments of the motorized running board system may be implemented.

Electronic control unit 50 may include circuitry to control various aspects of vehicle operation. Electronic control unit 50 may include, for example, a microcomputer that includes one or more processing units (e.g., microprocessors), memory storage (e.g., RAM, ROM, etc.), and I/O devices. The processing units of electronic control unit 50, may execute instructions stored in memory to control one or more electrical systems or subsystems in the vehicle. Electronic control unit 50 can include a plurality of electronic control units such as, for example, a contextual environment detection module, a preferred position determination module, a running board control module, an electronic engine control module, a powertrain control module, and so on. These various control units can be implemented using two or more separate electronic control units, or using a single electronic control unit.

In the example illustrated in FIG. 1, electronic control unit 50 receives information from a plurality of sensors 52 included in vehicle 100.

Sensors 52 may be included to detect conditions external to the vehicle 100. For example, sensors 52 may include imaging sensors (such as cameras), and proximity sensors (such as radar, LiDAR, and sonar) which may be used to detect the size, shape, and location of environmental features in the proximity of vehicle 100. Electronic control unit 50 may utilize the aforementioned sensors to detect the contextual environment and determine the preferred position of the running board for vehicle 10. The contextual environment may be a factor that electronic control unit 50 uses to determine the preferred position of the running board. As described above, electronic control unit 50 may utilize this contextual environment and preferred position of the running board to determine whether to adjust the running board from its current position in order to increase accessibility for vehicle occupants when entering or exiting the vehicle.

Sensors 52 may also include sensors which can be used to detect contextual environment features. For example, sensors 52 may include imaging sensors which monitor environmental features in proximity of the vehicle or within the range of motion of the running board. Accordingly, the electronic control unit 50 can utilize information from these sensors to determine whether the running board requires adjustment, and if the running board requires adjustment, determine where the running board should adjust to.

Sensors 52 may also include sensors which detect vehicle operation. For example, sensors 52 may include sensors which detect accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. Electronic control unit 50 may use data collected from these sensors to determine that vehicle 100 is moving, or moving above a threshold speed (e.g., above five miles per hour). In certain examples, electronic control unit 50 may restrict adjustment of the running board when vehicle 100 is moving, or moving faster than a threshold speed. This restriction can be because it is unnecessary for a running board to adjust while moving, as it risks vehicle occupant injury and/or damage to the running board or vehicle.

One or more of the sensors 52 may include their own processing capability to compute the results for additional information that can be provided to electronic control unit 50. In other examples, one or more sensors may be data-gathering-only sensors that provide only raw data to electronic control unit 50. In further examples, hybrid sensors may be included that provide a combination of raw data and processed data to electronic control unit 50. Sensors 52 may provide an analog output or a digital output.

Figure 2:
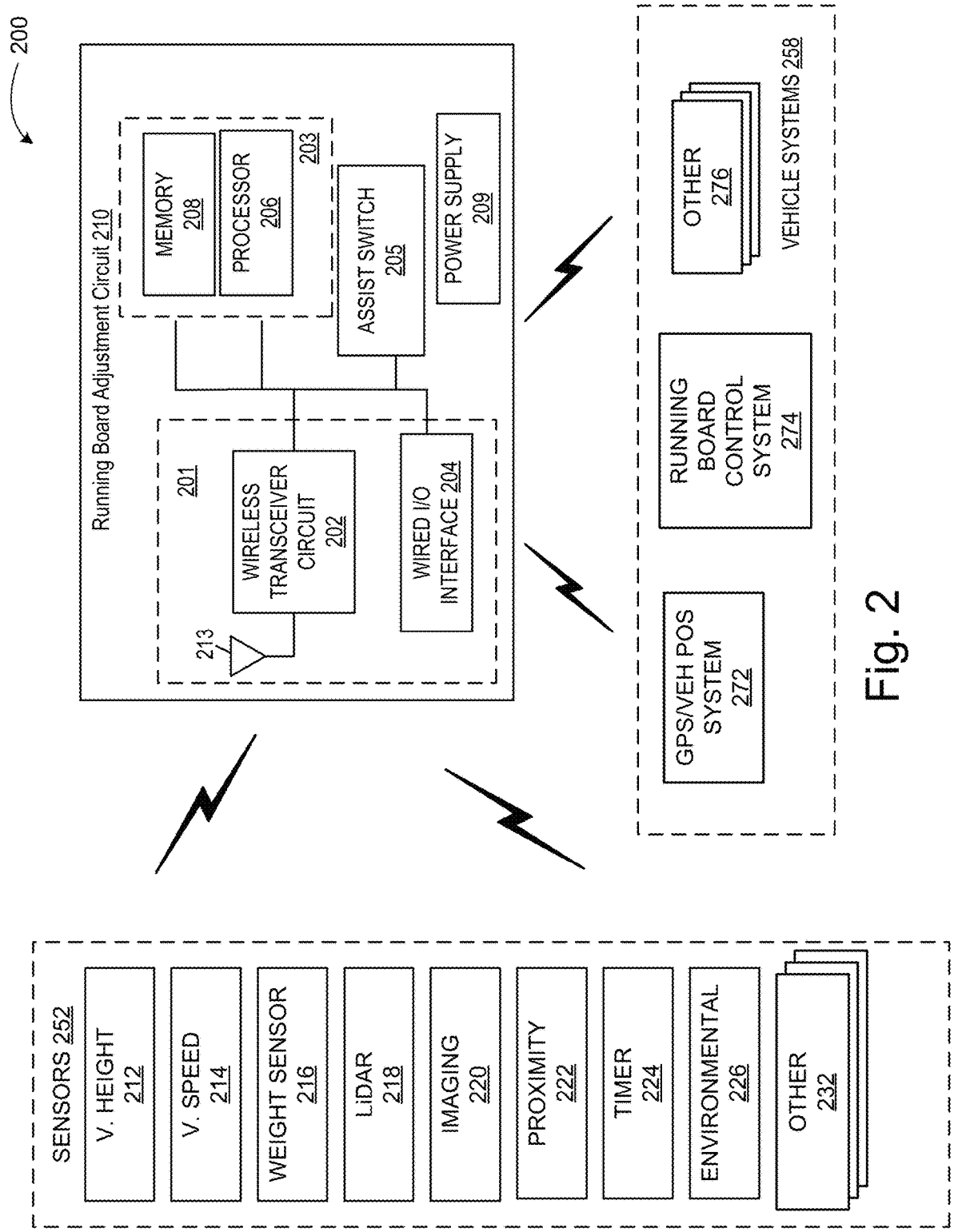
FIG. 2 illustrates an example architecture for (1) detecting a vehicle's contextual environment; (2) determining a preferred position of the running board based on the contextual environment; and (3) adjusting the position of the running board to reach the preferred position of the running board, in accordance with one example of the systems and methods described herein.

FIG. 2 illustrates an example architecture for (1) detecting a vehicle's contextual environment; (2) determining a preferred position of the running board based on the contextual environment; and (3) adjusting the position of the running board to reach the preferred position of the running board, in accordance with one example of the systems and methods described herein.

Referring now to FIG. 2, in this example, motorized running board system 200 includes a running board adjustment circuit 210, a plurality of sensors 252, and a plurality of vehicle systems 258. Sensors 252 and vehicle systems 258 can communicate with running board adjustment circuit 210 via a wired or wireless communication interface. Although sensors 252 and vehicle systems 258 are depicted as communicating with running board adjustment circuit 210, they can also communicate with each other as well as with other vehicle systems. Running board adjustment circuit 210 can be implemented as an ECU or as part of an ECU such as, for example electronic control unit 50. In other examples, running board adjustment circuit 210 can be implemented independently of an ECU.

Running board adjustment circuit 210 in this example includes a communication circuit 201, a decision circuit 203 (including a processor 206 and memory 208 in this example) and a power supply 209. Components of running board adjustment circuit 210 are illustrated as communicating with each other via a data bus, although other communication in interfaces can be included. Running board adjustment circuit 210 in this example also includes a manual assist switch 205 that can be operated by the user to manually select the preferred position of the running board or manually activate the lift function.

Processor 206 can include a GPU, CPU, microprocessor, or any other suitable processing system. The memory 208 may include one or more various forms of memory or data storage (e.g., flash, RAM, etc.) that may be used to store the calibration parameters, images (analysis or historic), point parameters, instructions, and variables for processor 206 as well as any other suitable information. Memory 208, can be made up of one or more modules of one or more different types of memory, and may be configured to store data and other information as well as operational instructions that may be used by the processor 206.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a running board adjustment circuit 210.

Communication circuit 201 may include either or both of a wireless transceiver circuit 202 with an associated antenna 213 and a wired I/O interface 204 with an associated hardwired data port (not illustrated). As this example illustrates, communications with running board adjustment circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 213 is coupled to wireless transceiver circuit 202 and is used by wireless transceiver circuit 202 to transmit radio (RF) signals wirelessly to wireless equipment with which it is connected and to receive radio signals as well. These RF signals can include information of almost any sort that is sent or received by running board adjustment circuit 210 to/from other entities such as sensors 252 and vehicle systems 258.

Wired I/O interface 204 can include a transmitter and a receiver (not shown) for hardwired communications with other devices. For example, wired I/O interface 204 can provide a hardwired interface to other components, including sensors 252 and vehicle systems 258. Wired I/O interface 204 can communicate with other devices using Ethernet or any of a number of other wired communication protocols whether standardized, proprietary, open, point-to-point, networked or otherwise.

Power supply 209 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 252 can include, for example, sensors 52 such as those described above with reference to the example of FIG. 1. Sensors 252 can also include additional sensors that may or not otherwise be included on a standard vehicle with which motorized running board system 200 is implemented. In the illustrated example, sensors 252 include vehicle height sensors 212, vehicle speed sensors 214, weight sensors 216 (e.g., weight placed on running board), LiDAR sensors 218, imaging sensors 220, proximity sensors 222 to determine the distance from the vehicle body to environmental features, timers 224 or timing sensors, and environmental sensors 226 (e.g., to detect salinity or other environmental conditions).

Additional sensors 232 can also be included as may be appropriate for a given implementation of motorized running board system 200. For example, as alluded to above, additional sensors 232 may include non-inertial sensors and proximity sensors (such as radar and sonar) which may be used to detect the movement and/or location of objects, such as vehicles, pedestrians, and environmental features. Sensors 232 may also include gyroscopic sensors which monitor the angular motion of the vehicle.

Vehicle systems 258 can include any of a number of different vehicle components or subsystems used to control or monitor various aspects of the vehicle and its performance. In this example, the vehicle systems 258 include a GPS or other vehicle positioning system 272 for detecting the location of vehicle 100 (including in relation to other vehicles and/or environmental features); running board control system 274 for actuating the at least one motor connecting the running board to the vehicle body; and other vehicle systems 276.

GPS/vehicle positioning system 272 may include one or more vehicle positioning systems that receive sensor data from one or more sensors 252. Vehicle positioning system 272 may determine the geographic location of the vehicle 100 or the position of the vehicle in relation to objects or environmental features.

Running board control system 274 may include at least one motor that may receive signals from the ECU, and actuate to adjust the position of the running board. Running board control system 274 may also include sensors that can determine a current position of the running board.

Other systems 276 may include various standard and non-standard systems that may be implemented into the motorized running board system 200. For example, a contextual environment module may be implemented to detect and map features of the surrounding environment and then send signals representative of said features to the ECU.

During operation, running board adjustment circuit 210 can receive information from various vehicle sensors to determine whether to adjust the position of the running board. Communication circuit 201 can be used to transmit and receive information between running board adjustment circuit 210 and sensors 252, and running board adjustment circuit 210 and vehicle systems 258. Also, sensors 252 may communicate with vehicle systems 258 directly or indirectly (e.g., via communication circuit 201 or otherwise).

Figure 3:
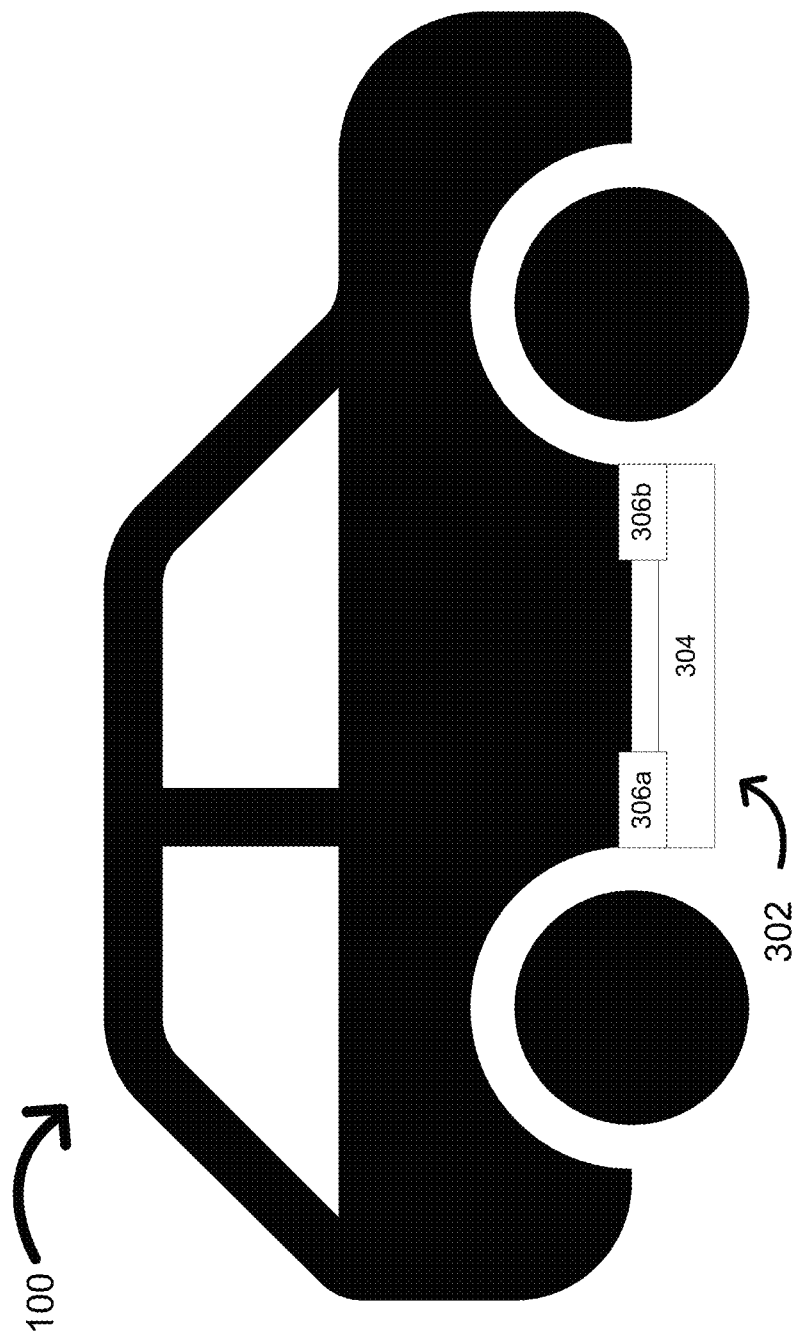
FIG. 3 depicts an example of a motorized running board, in accordance with various embodiments of the disclosed technology.

FIG. 3 depicts an example of a motorized running board 302 on a vehicle 100, in accordance with various embodiments of the disclosed technology.

As depicted, vehicle 100 may implement or position the motorized running board system 302 along the lower (lowest point below the door panel) exterior side of the vehicle. In other embodiments, the motorized running board system 302 may be implemented or positioned on the underbody of the vehicle 100. In further embodiments, the motorized running board system 302 may be implemented or positioned on the interior of the vehicle 300 (e.g., when the motorized running board system 302 is retracted or raised it may reside inside the surface of the vehicle 100). In the example illustrated in FIG. 3, the motorized running board system 302 may be located along the frame or base of the vehicle 100, and as discussed, may be controlled by an ECU (not shown) to extend outwards, perpendicular or parallel to the plane of the door of the vehicle 100, or any combination thereof, when a vehicle door is opened or otherwise when the system is activated. In other embodiments, the motorized running board system 302 may be controlled by an ECU to extend outwards, radially from the vehicle, such that it is extended at an angle. In this example, the motorized running board system 302 is located on the lower exterior side of the vehicle in between the front tires and the rear tires. Motorized running board systems 302 may be positioned at other points or locations on the exterior, interior, or underbody of the vehicle 100.

In the example illustrated in FIG. 3, the motorized running board system 302 has a running board 304 that extends the length, in between the wheel wells, of the base of the vehicle 100, and is connected to the body of the vehicle 100 by two motors 306a, 306b placed on the connection points of the running board 304. In certain embodiments, as depicted, the longitudinal length of the running board 304 may be less than the length of the base of the vehicle 100. In certain embodiments, the longitudinal length of the running board 304 may be longer than the length of the base of the vehicle 100. In certain embodiments, the motorized running board system 302 may be placed in the front or rear of the vehicle 100. In other embodiments, there may be more than one motorized running board system 302 connected to the vehicle 100. In further embodiments, the motorized running board system 302 may have more or less than two motors attached to the running board 304. In other embodiments, the motorized running board system 302 may be any combination thereof.

Figure 4:
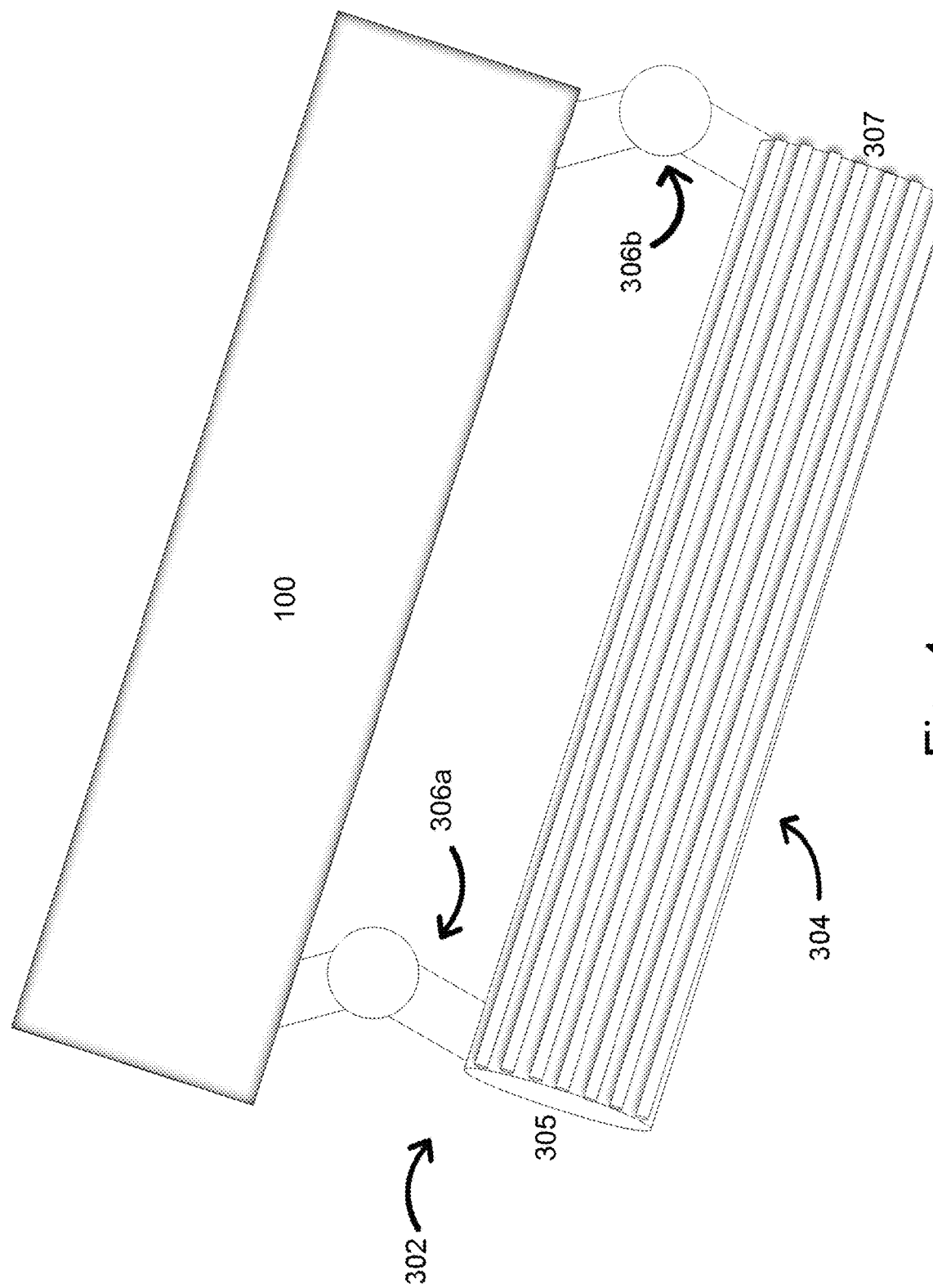
FIG. 4 depicts an example of a motorized running board, in accordance with various embodiments of the disclosed technology.

FIG. 4 depicts an example of a motorized running board 302 on a vehicle 100, in accordance with various embodiments of the disclosed technology. Here, the motorized running board 302 is depicted with two motors 306a, 306b connecting the running board 304 at a first connection point 305 and second connection point 307 to the vehicle 100.

In various embodiments of the present disclosure, a motorized running board system 302 may include at least one motor 306a, 306b connecting a running board 304 to a vehicle 100. For example, the running board 304 may have a first motor 306a attached to a first connection point 305, and a second motor 306b attached to a second connection point 307. In various embodiments, there may be more connection points on the running board 304, and the connection points may be disposed in any location on the running board 304. The placement of the connection points 305, 307 on the ends of the running board 304 is merely illustrative. In this example, the connection points may be on opposite edges of the running board 304. In other examples the connection points may be at any point on the running board 304. In other embodiments, the running board 304 may take the form of other shapes and include more than two ends. For example, the running board 304 may be a square with a single connection point and a single motor, which may allow for a vehicle occupant to place a single foot on the running board to enter or exit the vehicle. In another example, the running board 304 may be a platform with corners, sides, or edges that can be controlled by the at least one motor 306a, 306b. In yet another example, the running board 304 may be a collapsible surface, which can be expanded or contracted via the at least one motor 306a, 306b to increase or decrease the surface area with which a vehicle occupant can enter or exit the vehicle from.

In various embodiments, the running board 304 may be located externally on the vehicle. For example, FIG. 4 illustrates a running board 304 running parallel to the frame of the vehicle 100 (as depicted, FIG. 4. Illustrates a motorized running board system 302 attached to the lower center of a vehicle 100 in between the wheel wells). The running board may have at least one set of opposing edges. In certain embodiments, a first set of opposing edges may be perpendicular to the vehicle body and parallel to the ground. A second set of opposing edges may be parallel to the vehicle body and perpendicular to the ground. A third set of opposing edges may be perpendicular to the vehicle body and perpendicular to the ground. In various embodiments the third set of opposing edges may also be perpendicular to the first and second sets of opposing edges. In other embodiments there may be any combination of first, second, and third sets of opposing edges. For example, a running board may have a rounded first set of opposing edges, such that a second set of opposing edges does not exist, as the first set of opposing edges connect to one another at the furthest point from the centers of the opposing edge.

The various edges of the running board may be rounded or squared, beveled, or otherwise have a desired shape(s). One or more of the opposing edges may include a portion with traction for an occupant to stand on without slipping.

The traction portion may be grooved, ridged, or include any other feature that allows for an occupant to gain traction when stepping thereon. The first and second set of opposing edges on the running board 304 may be 10 centimeters (cm) to 1000 cm long. The first and third set of opposing edges on the running board may be 1 cm to 25 cm wide. The second and third set of opposing edges on the running board may be 1 cm to 15 cm in height. In embodiments, the running board 304 may be constructed from metal, plastic, polymers, rubber, and/or any other suitable material for holding weight on the exterior of the vehicle 100.

The at least one motor 306a, 306b may be attached to the running board 304 at, for example, the first connection point 305 and the second connection point 307. The first connection point 305 and the second connection point 307 may be located anywhere on any of the various opposing edges. In certain embodiments, the at least one motor 306a, 306b may be connected to the running board 304 by screw, bolt, fastener, glue, weld, and/or similar methods of connecting features. The at least one motor 306a, 306b may also be connected to the running board 304 such that the angle of the running board 304 can be adjusted, either manually, or automatically by the at least one motor 306a, 306b by receiving signals from the ECU representative of such desired movement. For example, the at least one motor 306a, 306b may be connected to the third set of opposing edges and rotate the angle of the running board by producing a rotational motion, when the ECU determines that the preferred position requires the running board to be radially offset (e.g., rotated to a certain angle). In this example, the rotation may be produced by engaging the motor, via the ECU, which may be connected to the running board, and either rotating the connector away from the body of the vehicle or towards the body of the vehicle. In other embodiments, the at least one motor 306a, 306b may be connected to the any of the various edges of the running board 304, or may be connected through one of the various edges and secured internally on the running board 304.

The at least one motor 306a, 306b can be actuated by the ECU to raise or lower the running board 304. For example, the running board 304 can be retracted to a position near the interior of the vehicle cabin, and upon opening a door, deploy to a position near the ground or environmental feature detected by the vehicle (e.g., a curb or puddle). In other embodiments, the running board may be adjusted from a first preferred position to a second preferred position, allowing a vehicle occupant to stand on the running board when the running board is being adjusted. The at least one motor 306a, 306b can be actuated to operate in unison or operate asynchronously. For example, when the vehicle is on a flat surface, the motors 306a, 306b may lower to a default position in unison to allow for a horizontal step when exiting the vehicle. In another example, when the vehicle is on a hill, the motors 306a, 306b may act asynchronously to lower one edge of the running board 304 further than its corresponding opposing edge to reach a preferred position, effectively angling the running board on its horizontal axis, allowing for a horizontal step when exiting the vehicle, even when the vehicle is radially offset (i.e., not level). The at least one motor 306a, 306b may also rotationally adjust the angle of the running board 304. For example, the running board 304 may be rotationally angled along the running board's longitudinal axis towards the vehicle when environmental sensors detect ice outside of the vehicle to prevent occupants from slipping upon entering the vehicle. In another example, the running board may be rotationally angled away from the vehicle when not in use to prevent water from building up on the running board 304.

In certain embodiments, the running board may be raised or lowered from 0 cm to 100 cm to reach its preferred position. In certain embodiments, the running board may radially rotate from 0 degrees to plus or minus 45 degrees, depending on the vehicle occupant's preferences and/or detected environmental conditions near the vehicle to reach its preferred position. In various embodiments, the running board may be adjusted these distances uniformly. For example, when the vehicle is parked next to a flat curb. In other embodiments, the connection points on the running board may be adjusted by these distances, independently. For example, when the vehicle is parked on hill and the occupant indicates they want a horizontally flat step when exiting the vehicle. These lengths and distances are merely examples and not meant to limit the disclosure, which is only limited by the language of the claims. The embodiments disclosed herein can be configured to operate with a variety of ranges as may be needed or desired (by manufacturer, user, etc.).

In various embodiments, the at least one motor 306a, 306b may be connected to the body of the vehicle 100 by screw, bolt, fastener, glue, weld, and/or similar methods of connecting features. In certain embodiments, the at least one motor 306a, 306b may be connected to the vehicle 100 via the vehicle's frame, chassis, and/or other structures strong enough to support the weight of the motorized running board system 302 and any vehicle occupants who may be disposed thereon. In other embodiments, the motorized running board system 302 may be connected to the vehicle 100 in other places or using other methods.

In various embodiments, the at least one motor 306a, 306b may be a high-voltage motor. The at least one motor 306a, 306b may also be a low- or medium-voltage motor. In certain embodiments, the at least one motor 306a, 306b may be located externally on the vehicle. In certain embodiments, the at least one motor 306a, 306b may attach to different connecting points on the running board 304 and the vehicle 100. In various embodiments, the at least one motor 306a, 306b may be connected to one or more batteries, which may be a low-, medium-, or high-voltage battery (not shown). In various embodiments, the ECU may control the movement of the low-, medium-, or high-voltage motors.

Figure 5:
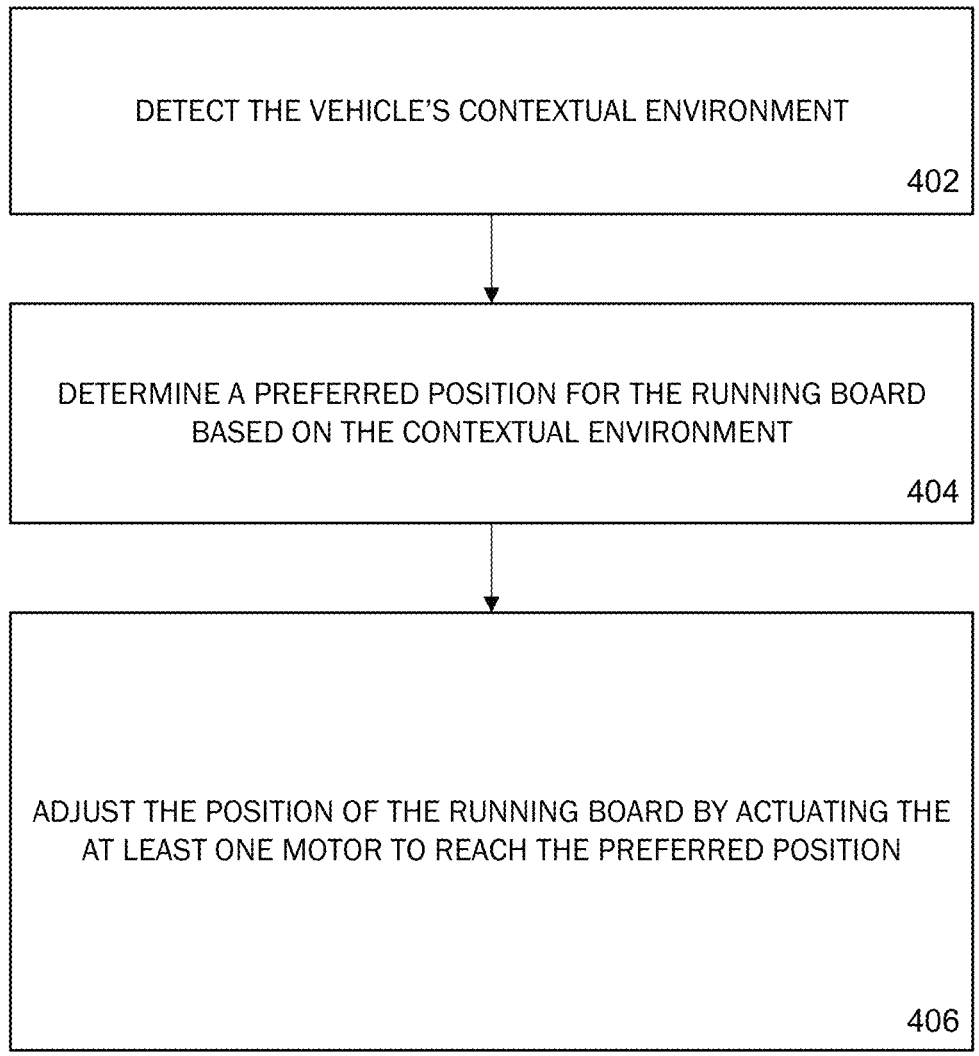
FIG. 5 is a flowchart illustrating example operations that can be performed by an electronic control unit in a vehicle to adjust the motorized running board in response to the contextual environment surrounding a vehicle, in accordance with various embodiments of the disclosed technology.

FIG. 5 is a flowchart illustrating example operations that can be performed by an electronic control unit in a vehicle to adjust the motorized running board in response to the contextual environment surrounding a vehicle, in accordance with various embodiments of the disclosed technology.

At operation 402, the ECU may detect the vehicle's contextual environment. As described in conjunction with FIGS. 1 and 2, the ECU may utilize various sensors on the vehicle to determine the contextual environment surrounding the vehicle and generate a localized map representing the contextual environment.

At operation 404, the ECU may determine a preferred position for the running board based on the contextual environment. As described in conjunction with FIGS. 1 and 2, the ECU may utilize the localized map in connection with vehicle sensors and driver preference to determine a preferred position for the running board.

At operation 406, in response to a determination that the preferred position of the running board is different than the current position of the running board, the ECU may adjust the position of the running board by actuating at least one motor connecting the running board to the vehicle body. Accordingly, the preferred position of the running board will take into account the contextual environment improving accessibility of the vehicle for occupants. Otherwise, if no environmental features are detected in the contextual environment, the ECU may actuate the motors to adjust the running board to a default position.

In some cases, the ECU of the motorized running board system may set a preferred position based on vehicle occupant preference. In various embodiments, a vehicles occupant may set a preference for how they like their running board to operate upon entering or exiting their vehicle. For example, a person who is more senior and struggles with mobility may wish to step onto the running board and be lowered to ground level (possibly if they drove a taller vehicle, such as an SUV) when exiting their vehicle. In such an example, the ECU would detect the contextual environment, and determine a first preferred running board position, which is closer to the vehicle than the ground, based on the contextual environment. The ECU would then determine a second preferred position, which is closer to the ground than the vehicle. The ECU would then actuate the at least one motor to adjust the position of the running board to the first preferred position, wait for sensors connected to the at least one motor or running board to detect that weight has been applied to the running board, and the adjust the position of the running board, with the vehicle occupant disposed thereon, from the first preferred position to the second preferred position. In other example, vehicle occupants may wish to only use their running board when certain environmental features are detection. For example, a person may wish to only use their running board when it is raining, thus their motorized running board system may not adjust unless the environmental sensors detect rain.

In some cases, the ECU of the motorized running board system may adjust based on contextual environment alone, such as, for example, the presence of rocks, potholes, curbs, puddles, or similar environmental features. In such an example, the motorized running board system may adjust the height and/or angle of the running board to account for the environmental features, and provide an occupant with a comfortable running board position that improves access to the vehicle. For example, if the vehicle sensors detect a curb, the ECU may only lower the running board half the distance between the interior of the vehicle and the curb, rather than half the distance between the interior of the vehicle and the street. In a further example, the sensors may detect that the vehicle is sitting at a 12 degree angle, thus the ECU may adjust the running board 12 degrees in the opposite direction to create a horizontal step for the vehicle occupant to enter or exit the vehicle on. In various embodiments, the height and angle of the running board may be determined by curb height, vehicle tilt or incline, topography (e.g., hills), grading, passenger preference, and/or similar environmental features.

As described above, the adjusted running board position may provide improved access to the vehicle. In other words, those with reduced mobility may be able to experience higher levels of comfort and safety when entering and exiting vehicles. In this way, vehicle accessibility may be increased while allowing vehicle occupants the freedom to drive and park anywhere they please.

The examples of FIGS. 1-5 are provided for illustration purposes only as examples of vehicle systems with which embodiments of the disclosed technology may be implemented. One of ordinary skill in the art reading this description will understand how the disclosed embodiments can be implemented with other vehicle platforms.

As used herein, the terms control and component might describe a given unit of functionality that can be performed in accordance with one or more examples of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various examples are described in terms of this example-computing component 500. After reading this description, it will become apparent to a person skilled in the relevant art how to implement the application using other computing components or architectures.

Figure 6:
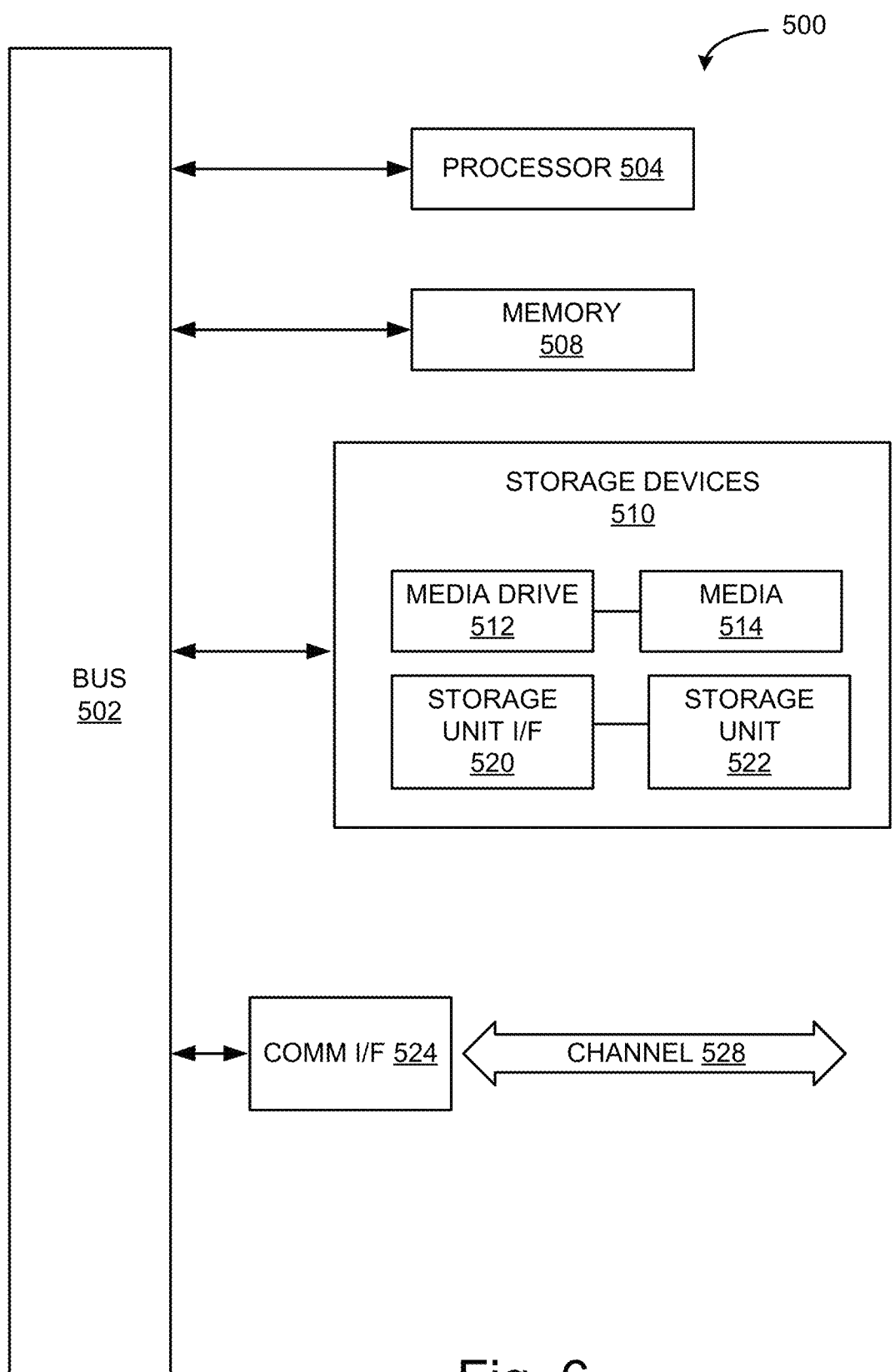
FIG. 6 is an example computing component that may be used to implement various features of embodiments described herein.

Referring now to FIG. 6, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor

504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative examples, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

It should be noted that the term "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
a running board connected to the vehicle via a first motor and a second motor;
the first motor connected to the running board at a first location along a length of the running board;
the second motor connected to the running board at a second location along the length the running board; and
one or more processors to execute machine executable instructions in non-transitory memory to:
detect a contextual environment surrounding the vehicle;
determine a preferred position for the running board based on the contextual environment; and
actuate at least one of the first motor and the second motor to tilt the running board to the preferred position by translating the first location along the length of the running board a greater distance than the second location along the length of the running board.

2. The vehicle system of claim 1, wherein detecting the contextual environment comprises:
receiving data from vehicle sensors representative of environmental features surrounding the vehicle.

3. The vehicle system of claim 1, wherein determining a preferred position of the running board, comprises:
detecting a current orthogonal position of the running board;
detecting the orthogonal position of the vehicle;
predicting a range of possible positions of the running board by:
retrieving a known range of motions of the running board,
limiting the known range of motion to form a range of possible motions by comparing the known range of motion to the detected contextual environment surrounding the vehicle and removing ranges that would cause the running board to collide with environmental features;
determining the preferred position of the running board based on the current orthogonal position of the running board, the orthogonal position of the vehicle, the range of possible positions of the running board, and driver preference.

4. The vehicle system of claim 1, wherein tilting the running board improves vehicle occupant accessibility when entering and exiting the vehicle.

5. A computer-implemented method comprising:
detecting a contextual environment surrounding a vehicle;
determining a preferred position of a running board of the vehicle based on the contextual environment, wherein the running board is connected to a first motor at a first location along a length of the running board and connected to a second motor at a second location along the length of the running board;
actuating at least one of the first motor and the second motor to tilt the running board to the preferred position by translating the first location along the length of the running board a greater distance than the second location along the length of the running board.

6. The computer-implemented method of claim 5, wherein actuating at least one of the first motor and the second motor to tilt the running board to reach the preferred position comprises adjusting horizontal and vertical height of the running board based on the preferred position of the running board.

7. The computer-implemented method of claim 5, wherein actuating at least one of the first motor and the second motor to tilt the running board relative to the orthogonal position of the vehicle to reach the preferred position further comprises rotating the radial position of the running board when the vehicle is radially offset.

8. The vehicle of claim 1, wherein actuating at least one of the first motor and the second motor to tilt the running board to the preferred position comprises:
actuating the first motor to translate the first location along the length of the running board a first distance relative to a vertical axis of the vehicle; and
actuating the second motor to translate the second location along the length of the running board a second distance relative to the vertical axis of the vehicle, wherein the first distance is greater than the second distance.

9. The computer-implemented method of claim 5, wherein actuating at least one of the first motor and the second motor to tilt the running board to the preferred position comprises:
actuating the first motor to translate the first location along the running board a first distance relative to a vertical axis of the vehicle; and
actuating the second motor to translate the second location along the running board a second distance relative to a vertical axis of the vehicle, wherein the first distance is greater than the second distance.

* * * * *